United States Patent
Balasu et al.

(10) Patent No.: US 7,680,565 B2
(45) Date of Patent: *Mar. 16, 2010

(54) SYSTEMS FOR ANNOUNCING THE HEALTH OF BALL SCREW ACTUATORS AND BALL RECIRCULATION

(76) Inventors: Mitchell Gabriel Mircea Balasu, 37 Marigold, Aliso Viejo, CA (US) 92656; Raphael A. Monsanto, 12 Rathbone Pl., Grosse Pointe, MI (US) 48230

( * ) Notice: Subject to any disclaimer, the term of this patent is extended or adjusted under 35 U.S.C. 154(b) by 0 days.

This patent is subject to a terminal disclaimer.

(21) Appl. No.: 12/150,754

(22) Filed: Apr. 29, 2008

(65) Prior Publication Data

US 2008/0319590 A1  Dec. 25, 2008

Related U.S. Application Data

(63) Continuation-in-part of application No. 11/728,214, filed on Mar. 23, 2007, now Pat. No. 7,366,590.

(60) Provisional application No. 60/785,080, filed on Mar. 23, 2006.

(51) Int. Cl.
*G01C 23/00* (2006.01)

(52) U.S. Cl. .............................. 701/3; 701/35; 244/75.1

(58) Field of Classification Search ...................... 701/3, 701/4, 29, 31, 35, 36; 244/75.1, 234, 221, 244/228

See application file for complete search history.

(56) References Cited

U.S. PATENT DOCUMENTS

| 6,739,550 | B2 * | 5/2004 | Koizumi et al. ............. 244/99.4 |
| 7,089,099 | B2 * | 8/2006 | Shostak et al. ................ 701/32 |
| 7,103,460 | B1 * | 9/2006 | Breed .......................... 701/29 |

\* cited by examiner

*Primary Examiner*—Richard M. Camby
(74) *Attorney, Agent, or Firm*—Rohm & Monsanto, PLC

(57) ABSTRACT

A method of determining variations in operating characteristics of a mechanical system having a rotatory mode of operation and bearing balls entrained within a bearing balls recirculation system. There are provided the steps of first monitoring operating impulses generated by the mechanical system during a first interval of operation; first analyzing the operating impulses obtained during the first interval to determine the intensity and frequency of the operating impulses; first correlating the operating impulses obtained during the first interval to corresponding angular positions of the rotatory mode of operation; and first producing a first record of the intensity and frequency of the operating impulses obtained during the first interval correlated to the corresponding angular positions of the mechanical system. The health of bearing balls within the recirculation system is determined by monitoring the vibration characteristic of the recirculation system, which is correlatable to the specific bearing balls.

20 Claims, 2 Drawing Sheets

SYSTEMS FOR ANNOUNCING THE HEALTH OF BALL SCREW ACTUATORS AND BALL RECIRCULATION

RELATIONSHIP TO OTHER APPLICATION

This application is a continuation-in-part patent application that claims the benefit of Provisional Patent Application Ser. No. 60/785,080, filed Mar. 23, 2006, and U.S. patent application Ser. No. 11/728,214, filed Mar. 23, 2007, now issued on Apr. 29, 2008 as U.S. Pat. No. 7,366,590, the disclosures of which are incorporated herein by reference.

BACKGROUND OF THE INVENTION

1. Field of the Invention

This invention relates generally to methods of annunciating impending failure and failure in actuators and drive train components, as well as vehicle braking systems.

2. Description of the Prior Art

There are present in the prior art a variety of vibration test systems that enable vibration analysis of operating mechanical systems to determine machine conditions and operating characteristics. In some of these known systems, a handheld device has an associated probe that is touched to an operating machine. The vibrations of the operating machine cause vibrations sensors in the probe to issue corresponding electrical responses that are analyzed by the handheld monitoring device. Although useful in the determination of the operating characteristics of an operating machine, the known vibration test systems are of only limited utility in determining the operating characteristics of mechanical systems that spend little or no time in steady-state modes of operation.

It is a characteristic of actuators, drive train components, vehicle braking systems, that a significant portion of operation time is spent in transient mode. For example, in a screw drive arrangement of the type used for controlling aircraft control surfaces, the operation of the screw drive arrangement is bidirectional over a limited extent. Therefore, this type of drive spends considerable portions of its operating cycles in bidirectional ramp-up and ramp-down transient conditions. Only a small portion of the operating cycle, if any, is spent in a steady-state condition.

In the case of drive train components, it is known that these mechanical systems can be tested in steady-state condition on a bench. However, in actual use, these mechanical systems are operated in acceleration, deceleration, and reverse modes of operation. Again, the known vibration test systems are inadequate to analyze the operating characteristics of drive train components in actual use.

Vehicle braking systems are mechanical arrangements that clearly operate in transient modes. In conventional use, the vehicle brakes are applied while the vehicle is operating at speed, and almost immediately the rate of operation is reduced by deceleration. The effects of such transients are multiplied in vehicle braking systems that are subjected to the stresses of automatic braking systems (ABS).

There is a need in the art for an on-board vibration test system that monitors the operation of a mechanical system of the type that operates principally in transient modes, and develops trend, or historical, data that reflects changes in the operating characteristics of the mechanical system. There is additionally a need for such a system to be useful in the tracing back of the changes in the overall response of the mechanical system to a change in the operating characteristic of a specific component of the mechanical system.

In addition to the foregoing, in embodiments where the mechanical system is a ball screw arrangement, there is a need to determined the health of the bearing balls and the bearing balls recirculation system. One mode of failure of the mechanical system occurs when the bearing balls escape. In such a failure mode, the load is transferred to a secondary nut that operates in an acme mode.

A further form of failure occurs when the balls are seized within the recirculation system. In effect, the ball screw operates in an acme mode, and the load is not transferred to the secondary load path, which often is an acme nut, until the bearing balls become dangerously worn.

A still further form of ball screw failure occurs when the bearing balls become scuffed, which results in accelerated wear. A ball screw arrangement that is operating with scuffed bearing balls is an unhealthy mechanical system that may soon fail.

There is, therefore, a need in the art for a system and methodology that monitors the health of a ball screw arrangement, including the bearing balls recirculation system.

There is also a need in the art for a system and methodology that facilitates the vibrational analysis of mechanical systems that operate largely in transient modes.

There is additionally a need for a system that facilitates the determination of impending failure of mechanical systems that operate largely in transient modes.

There is additionally a need for a system that facilitates the determination of actual failure of mechanical systems that operate largely in transient modes.

SUMMARY OF THE INVENTION

The present invention provides a method of determining variations in operating characteristics of a mechanical system having a rotatory mode of operation. In accordance with a first method aspect of the invention, there are provided the steps of:

first monitoring operating impulses generated by the mechanical system during a first interval of operation;

first analyzing the operating impulses obtained during the first interval to determine the intensity and frequency of the operating impulses;

first correlating the operating impulses obtained during the first interval to corresponding angular positions of the rotatory mode of operation;

first producing a first record of the intensity and frequency of the operating impulses obtained during the first interval correlated to the corresponding angular positions of the mechanical system;

second monitoring operating impulses generated by the mechanical system during a second interval of operation;

second analyzing the operating impulses obtained during the second interval to determine the intensity and frequency of the operating impulses;

second correlating the operating impulses obtained during the second interval to the corresponding angular positions of the rotatory mode of operation of the mechanical system;

second producing a second record of the intensity and frequency of the operating impulses obtained during the second interval correlated to the corresponding angular positions of the mechanical system;

comparing the first and second records to determine differences in the operating impulses obtained during the respective first and second intervals correlated to the corresponding angular positions of the mechanical system; and vibration monitoring of the bearing balls recirculation system.

In one embodiment, there are provided the further steps of:

further monitoring operating impulses generated by the mechanical system during subsequent intervals of operation of the mechanical system;

further analyzing the operating impulses obtained during the subsequent interval to determine the intensity and frequency of the operating impulses of the mechanical system during respective subsequent intervals;

further producing a plurality of further records of the intensity and frequency of the operating impulses obtained during respective ones of the subsequent intervals correlated to the corresponding angular positions of the mechanical system; and comparing the first, second, and further records to determine a trend in the differences in the operating impulses obtained during the respective first, second, and subsequent intervals.

In a highly advantageous embodiment, there is further provided the step of identifying a cause in the mechanical system for the trend in the differences in the operating impulses obtained during the respective first, second, and subsequent intervals. In mechanical systems that are rotatory, there is provided the step of identifying a cause in the mechanical system for the trend in the differences in the operating impulses obtained during the respective first, second, and subsequent intervals comprises the further step of acquiring rotatory position data of the mechanical system. Such a rotary mechanical system is, in some embodiments, a ball screw system, an acme screw system, a vehicle drive train, a flight control actuator, or a vehicle braking system.

In a specific illustrative embodiment of the invention, the bearing balls within the bearing balls recirculation system have respectively discernible characteristics that is identified by a bearing balls recirculation system vibration monitoring system and correlated to specific ones of the bearing balls. In this manner, not only is the health of each of the bearing balls determinable, but also the direction of bearing balls travel within the bearing balls recirculation system.

In a still further embodiment of the invention, there is further provided the step of quantifying the trend in the differences in the operating impulses obtained during the respective first, second, and subsequent intervals comprises the further step of acquiring rotatory position data of the mechanical system into respective qualities of operation of the mechanical system. Such quantification may include, for example, good, acceptable, and bad operating conditions that are associated with respective levels of required maintenance. More detailed data responsive to the health of the mechanical system is obtained at an output of a processor.

The monitoring that is effected during the practice of the present invention may be any form of monitoring, such as acoustic signal monitoring, vibration signal monitoring; or displacement signal monitoring. The monitored signals, responsive to operating impulses generated by the mechanical system during the respective intervals of operation, are subjected to a Fourier analysis.

In accordance with a further method aspect of the invention directed to a flight control actuator, there are provided the steps of:

first monitoring operating impulses generated by the flight control actuator during a first interval of operation;

first analyzing the operating impulses obtained during the first interval to determine the intensity and frequency of the operating impulses;

first correlating the operating impulses obtained during the first interval to corresponding angular positions of the rotatory mode of operation;

first producing a first record of the intensity and frequency of the operating impulses obtained during the first interval;

second monitoring operating impulses generated by the flight control actuator during a second interval of operation;

second analyzing the operating impulses obtained during the second interval to determine the intensity and frequency of the operating impulses;

second correlating the operating impulses obtained during the second interval to the corresponding angular positions of the rotatory mode of operation;

second producing a second record of the intensity and frequency of the operating impulses obtained during the second interval;

comparing the first and second records to determine differences in the operating impulses obtained during the respective first and second intervals of operation of the flight control actuator;

determining a vibration signature of a bearing balls recirculation system; and determining a mechanical reason for differences in the operating impulses obtained during the respective first and second intervals of operation of the flight control actuator.

In certain embodiments of this further method aspect where the flight control actuator is of the type having bearing elements, one mechanical reason for differences in the operating impulses obtained during the respective first and second intervals of operation of the flight control actuator is deformation in the bearing elements. Additionally, in embodiments where the flight control actuator is of the type having bearing races, mechanical reason for differences in the operating impulses obtained during the respective first and second intervals of operation of the flight control actuator is deformation in the bearing races. Still further, in embodiments where the flight control actuator is of the type having a ball screw containing ball bearings, a mechanical reason for differences in the operating impulses obtained during the respective first and second intervals of operation of the flight control actuator is reduced effectiveness of the ball bearings. In yet further embodiments where the flight control actuator is of the type having an acme screw, a mechanical reason for differences in the operating impulses obtained during the respective first and second intervals of operation of the flight control actuator is increased friction.

In embodiments where the flight control actuator is of the type having a screw shaft, a mechanical reason for differences in the operating impulses obtained during the respective first and second intervals of operation of the flight control actuator is damage to the screw shaft. A further reason for differences in the operating impulses obtained during the respective first and second intervals of operation of the flight control actuator is a change in the backlash.

The vibration monitoring sensor is installed in some embodiments on the ball nut. Alternatively, however, the vibration sensor can be installed on the screw shaft, or both. In embodiments where the sensor is installed on the screw shaft, there is additionally provided a data port for issuing the impulse data responsive to the steps of first and second monitoring.

The impulse data is responsive to the steps of first and second monitoring and is made available to a user at a data display system. Some of the data from the mechanical system is transmitted using a wireless transmission system.

BRIEF DESCRIPTION OF THE DRAWING

Comprehension of the invention is facilitated by the annexed drawing, in which.

DETAILED DESCRIPTION

Figure 1:
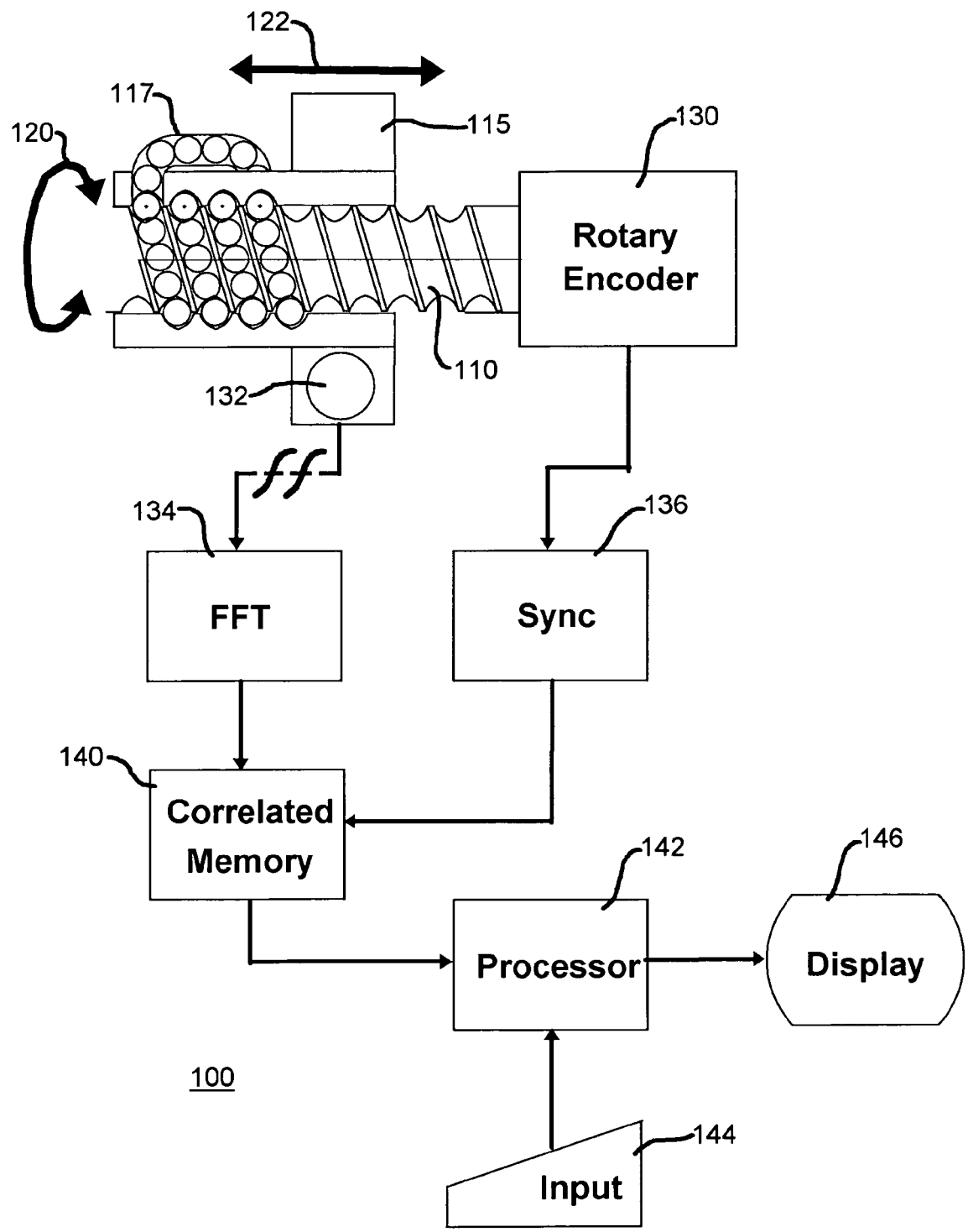
FIG. 1 is a schematic and function block representation of an annunciation arrangement for a ball screw actuator.

FIG. 1 is a schematic and function block representation of an annunciation arrangement 100 for a ball screw actuator. As shown in this figure, a screw shaft 110 is configured to engage a ball nut 115, and there is provided a ball recirculating system 117 that provides a multiplication of bearing balls (not specifically designated) in the interface between the screw shaft and the ball nut. As screw shaft 110 is rotated, illustratively in the direction of torque arrow 120, ball nut 115 is urged in the linear direction in accordance with bidirectional arrow 122.

In this embodiment of the invention, screw shaft 110 is coupled to a rotary encoder 130 that issues electrical signals that correspond to the angular position of the screw shaft. There is additionally provided in this specific illustrative embodiment of the invention a vibration transducer 132 that is shown to be directly coupled to the ball nut. Vibration transducer 132 receives acoustic or vibrational or displacement information from the ball nut, and produces corresponding signal that is propagated to a Fast Fourier Processor (FFT) 134. The output of the FFT 134 is propagated to a synchronizer 136 that receives the angular position signals from rotary encoder 134. Thus, FFT "snapshots" are correlated to the angular position of the screw shaft and stored in a correlating memory system 140. It is to be noted that in some embodiments of the invention the data from vibration transducer 132 is propagated to FFT 134 by means of a wireless transmission system. This, as noted herein, provides significant advantages in applications where the ball screw arrangement is inaccessibly disposed on the mechanical system (not shown). In applications where the present arrangement is installed in an aircraft (not shown), other items of data may wirelessly be transmitted. However, in some aircraft applications the rotary encoder data is available from the aircraft's system.

A processor 142 receives information from correlating memory system 140, which may, in certain embodiments, contain data corresponding to historical FFT snapshots obtained during prior test intervals. Processor 142 additionally will, in certain embodiments, maintain a count of the angular position data and correlate same to linear displacement of the ball nut along the screw shaft (in the direction of bidirectional arrow 122). Thus, trend data responsive to angular position of the screw shaft, which corresponds to possible deflection of bending thereof, and trend data responsive to linear displacement, which corresponds to thread damage, is obtained. In some embodiments, the recirculation cycle of the bearing balls (not specifically designated) is counted to form a data cycle that will reveal damage to one or more of the bearing balls. All of the foregoing data is made available to a user (not shown) at a display 146, in response to data and mode requests entered at an input 144.

1. Methods of annunciating failure in flight controls and aerospace jack screw actuators (ball screws, roller screws, and ACME screws), and rotary actuators.
   a. Using System Vibration Signature Monitoring A compact micro-processor controlled on-line data collection vibration signature monitoring system equipped with vibration and/or velocity and/or accelerometers allows early failure detection in jack screws.

Failure related to damage in the moving components of flight controls and aerospace electromechanical actuators, such as ball screws, roller screws, ACME screws, threads, bearing's outer races, inner races, ball bearings, rollers, cage, return tubes or return circuits, anti-backdrive devices, gear train components, clutches, motor assembly components can be diagnosed on-line by monitoring the impulses caused by material damage in these areas (features/components), measuring the intensity and frequency of the impulses, and observing the trend of these values over a period of time.

The following types of failures, without limitation, can be diagnosed using vibration monitoring:
   i. deformation in the bearing elements or races;
   ii. increased friction (scuffing, skidding);
   iii. distortion or breakage of the screw shaft (shaft bending will cause unbalance in the system, therefore periodic vibrations, and the fracture of the shaft, if the actuator is still operational, would have a different resonance frequency due to the different length which would generate a different vibration signature (response) when excited by the system during actuation).
   iv. separation/loss of ball bearings from the ball nut (due to any reasons, especially due to failure of the ball recirculation system).
   v. distortion or breakage of the anti-backdrive (no back) components such as the pawl, the pawl shaft, the cage or the thrust plate.

The angular position of the mechanical system is determined from on-board encoders and resolvers that are coupled to a system shaft. In some embodiments, it is advantageous to know the RPM of the system so that the outside noise can be filtered out and a clean signal extracted for analysis.

If the failure monitoring pertains to a flight control actuator, and because vibration monitoring testing requires higher RPMs, the tests are, in certain embodiments, conducted on the ground, at predetermined maintenance cycles. In a preferred embodiment, however, the microprocessor unit is an integral part of the actuator system and, coupled with angular position determining circuitry, can be used to analyze the mechanical system during actual use in transient modes. However, depending on the test frequency, it can also be designed as aircraft ground maintenance equipment.

b. Using Strain Gages

The secondary load path elements in actuators are sometimes preloaded (e.g. tie rod mounted through the screw shaft of an actuator). The preload is necessary in some applications to increase the column buckling stability of the screw shaft under compressive stresses. The secondary load path in the case of a tie rod serves the purpose of carrying the total load in case of failure of the primary load path (e.g. screw shaft).

Detecting dormant failures of such elements is critical. The strain gage is, in some embodiments, permanently attached to a component operating under constant compressive or tension stress, and appropriate ports for effecting electrical communication can, in certain embodiments, be disposed in an accessible external socket of the actuator system. After the assembly operation is finalized and the subject component that needs to be monitored has been preloaded, an "initial condition" ("birth certificate") reading as supplied, for example, by OEM, can be taken and recorded (electronically or manually) by connecting a data reading or data-acquisition instrument to the external socket where the strain gage is connected.

At further maintenance cycles, or during on-line live monitoring, the preload variance can be monitored, studied for trends, and used for failure diagnostic and warning indicators triggering (e.g. a fracture in a tie rod operating in tension, would indicate zero stresses after fracture and the system would announce failure after comparing this new reading with the initial calibration reading recorded at the time the system was manufactured or placed in service after maintenance).

c. ACME Screw (Square Thread, Castle Thread, Etc.) Actuators—Using Sliding Friction Threads Backlash Indicator A probe is attached to the end face, in lieu of a sector of thread inside the of the ACME nut, or in lieu of a sector of thread on the screw. The maximum allowable backlash in the unit resulting either due to wear of the nut threads or screw threads, depending on the geometry of the thread, will determine (using basic geometry and trigonometry math formulas), a set distance to the flanks of the threads.

Any excessive wear in the threads will cause the probe to engage with the threads and the failure to be detected.

Many faults and types of damage in linear and rotary actuator systems lead to mechanical vibrations with frequencies directly related to the rotational speed of their components or rotor. Of special interests are e.g., unbalance, alignment errors, ball bearing-pass frequencies, gear mesh frequencies in gearboxes, that occur as rotor-synchronous vibrations or harmonics (orders) of the rotor's rotational frequency.

The vibration behavior that the actuator system exhibits over the entire speed range will provide important information about the resonance profile of the actuator system, which later can be used for diagnostic purposes. The FFT spectrum can be used for the faults and damage analysis of an actuator system. In a highly advantageous embodiment po the invention, FFT snapshots are correlated to angular position of the mechanical system. In addition to enabling assessment of the operation of a mechanical system that operates in transient modes, such correlation to angular position facilitates identification of a mechanical system component that is about to fail, as evidenced by changes in the angular position correlated FFT snapshots over time. By employing a precise and accurate tracking analysis, an extremely fast and selective narrowband measurement of rotor synchronous vibrations can be measured. Thus the most significant vibration signals from the actuator system can be analyzed in any operating phase: stationary operation, run-up, coast-down, reverse, or over a longer time, to account for the thermal mechanical events of the actuator system.

The operation of the present invention is enhanced in certain embodiments by archiving the data locally (in a memory chip attached to the actuator), whether while performing online monitoring or off-line measurements, the overall readings, the current value, the previous value and the relationship with the alarm value shall always be available. Based on a pass or fail criteria an alarm signal is, in certain embodiments, provided when the vibration measurement instrumentation detects out-of-range or otherwise unacceptable values, or a modified profile of the readings compared to the baseline configuration and vibration signature model stored at the beginning of life of the actuator. Various failure modes (such as ball bearing damage, ball bearing escape and separation from the assembly, gear tooth breakage, skewered roller damage, ratchet or pawl fracture, radial bearings failure, slip clutch components failure, tie rod or torsion rod failure, etc.), can be simulated and induced into the system during qualification testing of the actuator, to ensure proper calibration and understanding of the impact produced by the failure of each of the different components onto the overall vibration signature of the assembly.

The use of such vibration diagnostic annunciation system allows early detection of impending failure, before its magnitude becomes critical or catastrophic. The vibration annunciation method of the present invention is useful to detect numerous failure types such as, but not limited to, ball escape, bearing race pitting or spalling, cracking or fracture of rotary or stationary components. Problems arising from unbalance, misalignment, gear damage, bearing damage, can be recognized at an early stage. Impulses caused by damage to the outer race or inner race of a bearing surface, to the roller(s) or ball bearing(s), or corresponding cages are a good indicator of the bearing condition. Reliable monitoring of the actuator assembly condition is possible by measuring the intensity and frequency of the impulses, and observation of the trend of these values over a period of time allows accurate diagnostic of the integrity and operation readiness of the jackscrew actuator.

Flight control actuator system damage and losses related to abnormal aircraft operations (unscheduled repairs or accidents), as a result of failed actuator can be successfully avoided by monitoring the "health" (structural integrity) of the actuator system by using the vibration monitoring failure annunciation.

In general aerospace applications, and specifically in flight controls actuation, weight control and reduction is very important. The advantage of using active vibration monitoring failure annunciation consists in minimum weight increase to the actuator system, consisting of two to three pickups (accelerometers), and wiring. The rest of the diagnostic logic can be supplied in a separate enclosure dedicated to data collection and monitoring the vibration signature of the actuator system, or it can easily be integrated into the existing flight control computers of the aircraft as an additional subroutine in the complex software programs that already govern the functionality of the flight control systems with today's modern aircraft.

The accelerometer probes can be mounted on the actuator assembly housing or attached directly to various subcomponents of the system. In some cases for the evaluation of the actuator system condition, simultaneous measurements from two points on this actuator system must be considered, i.e., a simultaneous acquisition through two channels of the instrument would be required for comprehensive diagnosis of the actuator system. A dual channel operation approach will be more accurate in providing reliable measurements on the system.

For systematic acquisition evaluation of all measurements types for predictive actuator maintenance, the following types of readings can be used: amplitude phase versus speed check amplitude phase versus time.

For efficient fault detection multiband pass space filters in the frequency range of measurement can be applied. The computer instrumentation software can be tailored to various operating ranges of the actuator system, and a database archiving system can provide information for predictive actuator system diagnostic and maintenance.

The vibration diagnostic method will allow predictive actuator system maintenance, therefore higher levels of aircraft availability for flight missions (dispatchability) prevention of unscheduled repairs, limitation of flight control system components damage or flight incidents, by early fault diagnosis, lengthening of intervals between inspections and timely planning to have optimally scheduled repair actions are the basis for the cost-effective significance of this strategy for an entire company.

The prerequisite for this is continuous knowledge of the current actuator system condition during operation. Mechanical vibrations, bearing condition values, speeds and process values are authoritative indicators with which the actuator system condition can be assessed and diagnosed. Which characteristic parameters should be acquired and how often, depends not only on the complexity and absolute value of the actuator system but also on the criticality of the aircraft system that is monitored.

The characteristic parameters will be calibrated on the monitoring system and initial vibration signature certificates will be recorded at entrance into service, as mounted on the aircraft. This represents a reference data set that will be used as a baseline, and will be therefore considered a normal operating condition data set.

The periodic readings, whether online with active sensors mounted on the actuator housing or attached directly to specific components, or off-line at predetermined maintenance checks intervals, can be archived via computer software and a common database for all measured data.

Standard acceleration, velocity and displacement sensors can be used.

The measuring functions that can be employed in the vibration diagnostic, are:

Absolute bearing vibrations relative shaft vibrations bearing condition speed measurement tempted to measurement damage to the internal and external lead screw threads, failure of the ratchet pawls of the anti-backlash brake (No Back), damage to the skewed roller clutch components (rollers, cage).

It is advisable to employ instrumentation that allows flexible configurations for various setups of the high and low pass filters for broadband measurement. This guarantees optimum adaptation to the individual measurement task. It is advisable to employ an averaging function for noise influence.

Damaging the internal components of an actuator system, such as material separation from the screw or nut threads, pitting and spalling of the rollers and ball bearings, breakage of the ratchet-pawls in a slip clutch, breakage in the cage of the skewed roller clutch, would result in a beat effect which will be easily detectable when recording frequency versus time.

If unacceptably high overall vibrations, intermittent beatings or bearing conditions, are found in the process of monitoring and diagnosing actuator system health, the causes can be identified by using frequency analysis (FFT) and envelope analysis. The anomalies (increased vibrations), can be traced to unbalance, misalignment, a bearing or gear fault or some other source.

The control and failure-detection in torsion, compression, or tension stressed beams using strain gage measurement can effectively be used in preventing catastrophic failures by early detection of dormant secondary load path failures, and is mostly beneficial in difficult to access areas of the airplane, where visual or direct access inspection can be accomplished only by disassembly of a multitude of components. As example, but not limited to, the hard to access internal tie rod or torsional spring assemblies are good candidates for this monitoring method.

The early detection of upcoming failure with minimum invasive disassembly and labor, is critical in flight controls actuators. The secondary load path failure through cracking, and ultimately through fracture of the tie rod or torsion rod inside the screw shaft of an actuator can be identified and diagnosed by employing strain gauges mounted directly on the broad shaft, either by using a single probe or multiple (odd number) probes setup for a logical voting decision making process within the monitoring or diagnostic instrumentation.

The strain gauges can be attached directly to the rod that is operating under tension, compression or torsion stresses. The corresponding wiring from these strain gauges shall be then routed in a specifically designed gap between the inner diameter of the screw shaft and the outside profile of the tie rod, or in a different manner (channels on the outside surface of the rod, drilled holes in the rod, etc.), towards the end face of the rod that protrudes outside of the screw shaft, and outside of the actuator where possible. In this location the wiring is routed to a connector that is available to be used by either the maintenance personnel, equipped with an off-line piece of instrumentation, or connected on-line directly to the flight control computers of the airplane for active monitoring of the secondary load path integrity inside the screw shaft of the actuator.

The use of noninvasive methods that allow continuous on-line remote monitoring and a highly reliable operation readiness of the internal components in a flight control actuator, is beneficial because it also minimizes the probability of errors that may occur in case maintenance personnel would have to disassemble many components to expose and inspect internal features that are provided for the safety of the actuator system. The probability of errors in reassembling the components in a prescribed order to ensure proper functionality of the actuator system is reduced or eliminated by using this method (strain gauges wired to an external connector or by using strain gauges that will report wirelessly the status of the stresses at their location), therefore the system safety will be increased when employing this type of monitoring and diagnostic method.

Figure 2:
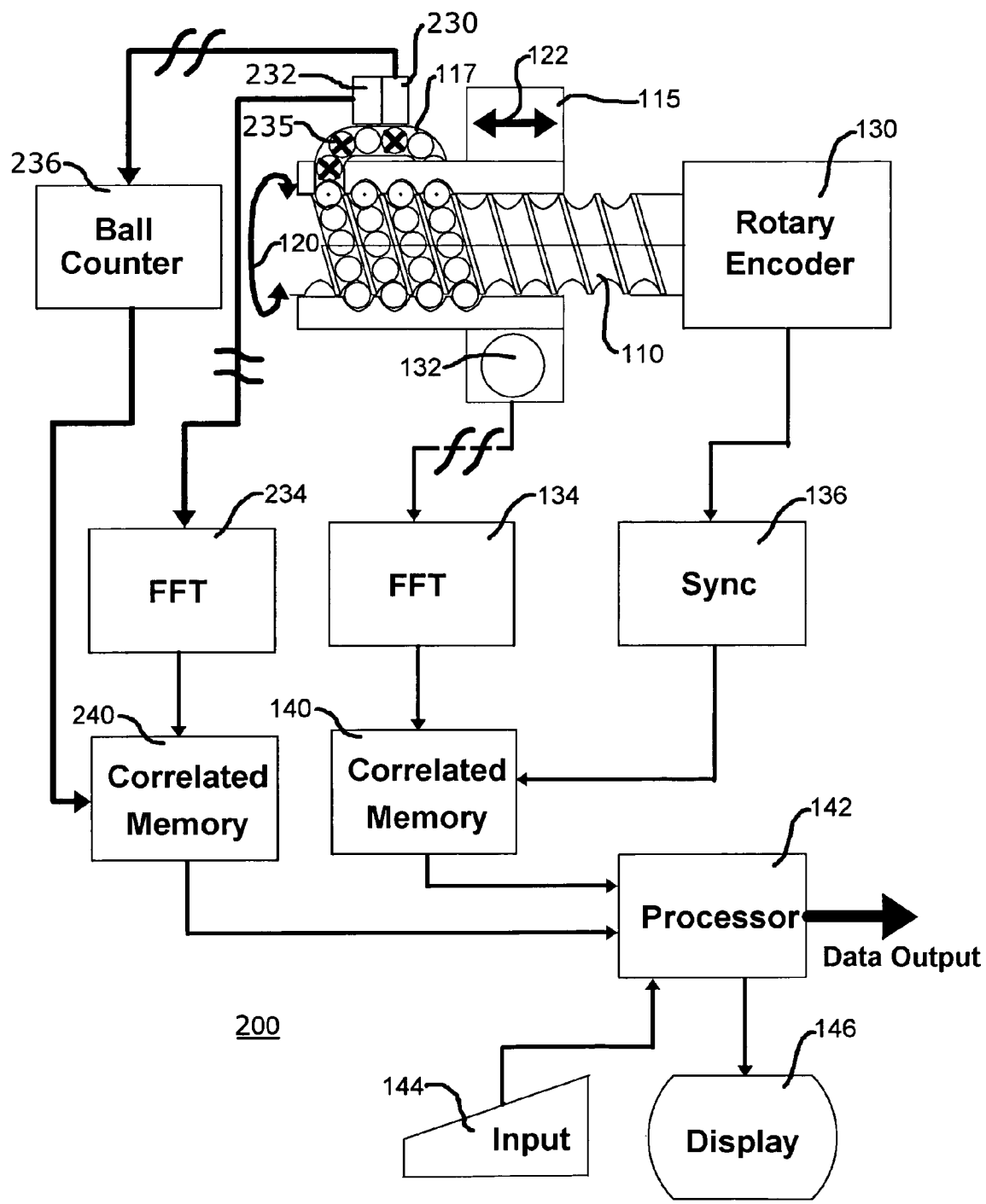
FIG. 2 is a schematic and function block representation of an annunciation arrangement for a ball screw actuator having incorporated therein a system for monitoring the health of bearing balls and the bearing ball return system.

FIG. 2 is a schematic and function block representation of an annunciation arrangement 200 for a ball screw actuator having incorporated therein a system for monitoring the health of bearing balls and the bearing ball return system. Elements of structure that have previously been discussed are similarly designated in this figure.

There is shown in this figure adjacent to ball recirculating system 117 a bearing ball sensor 230 that is configured to sense the passage of bearing balls. In particular, ball recirculating system 117, in this specific illustrative embodiment of the invention, distinguishes between the conventional bearing balls (not specifically designated) and bearing balls 225 (marked with an "X"). Bearing balls 225 are possessed of a discernable characteristic, such as a magnetic characteristic, that is observable by ball recirculating system 117 through the bearing balls return conduit. In addition, bearing balls 225 are arranged within the train of bearing balls in accordance with a predetermined sequence, whereby the number of bearing balls and the direction of travel within ball recirculating system 117 can be determined. For example, bearing balls 225 can be staggered within the bearing balls train as two such bearing balls 225 (a first pair of bearing balls) being disposed adjacent to one another and an additional bearing ball 225 separated from the first pair. In this manner, the total number of bearing balls and their direction of travel within ball recirculating system 117 can be determined. In addition, as will be discussed below, the health of respective ones of the bearing balls can be determined by analyzing the acoustic characteristic associated with each such bearing ball.

The output of bearing ball sensor 230 is delivered to a bearing balls counter 236 that maintains a sequential count of the bearing balls. This data then is delivered to a correlating memory system 240 that, as described below, correlates each of the bearing balls to an associated acoustic signature.

The acoustic signature is derived from a signal provided by an acoustic or vibration sensor 232. The vibration signal is propagated, illustratively wirelessly to, subjected to a frequency analysis at, an FFT 234. The output of FFT 234 is correlated to the associated ones of the bearing balls at correlating memory system 240, the output of which is delivered to processor 142. In some embodiments of the invention the correlating memory systems and the FFT systems are incorporated with the processor in a single device, which may be an ASIC (not shown). In other embodiments, bearing ball sensor 230 and vibration sensor 232 are combined as a single sensor. In such embodiments where the sensors are combined, bearing balls 235 can be configured to produce a predetermined acoustic signature that is distinguishable over the acoustic signatures of the other bearing balls.

The resulting data is displayed at display 146, which in some embodiments of the invention is a computer display, or may simply be one or more indicator lamps. In addition, a data output port may be provided for communicating the health of the ball screw and its associated bearing balls and ball recirculating system to a maintenance system (not shown).

In a still further embodiment of the invention, the health of the recirculation system is determined by analyzing a vibration characteristic of the system, and subtracting therefrom in the processor the vibration characteristic of the ball nut.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

What is claimed is:

1. A method of determining variations in operating characteristics of a mechanical system having a rotatory mode of operation and a bearing balls recirculation system, the method comprising the steps of:

first monitoring operating impulses generated by the mechanical system during a first interval of operation;

first analyzing the operating impulses obtained during the first interval to determine the intensity and frequency of the operating impulses;

first correlating the operating impulses obtained during the first interval to corresponding angular positions of the rotatory mode of operation;

first producing a first record of the intensity and frequency of the operating impulses obtained during the first interval correlated to the corresponding angular positions of the mechanical system;

second monitoring operating impulses generated by the mechanical system during a second interval of operation;

second analyzing the operating impulses obtained during the second interval to determine the intensity and frequency of the operating impulses;

second correlating the operating impulses obtained during the second interval to the corresponding angular positions of the rotatory mode of operation of the mechanical system;

second producing a second record of the intensity and frequency of the operating impulses obtained during the second interval correlated to the corresponding angular positions of the mechanical system;

comparing the first and second records to determine differences in the operating impulses obtained during the respective first and second intervals correlated to the corresponding angular positions of the mechanical system; and vibration monitoring of the bearing balls recirculation system.

2. The method of claim 1, wherein there are provided the further steps of:

further monitoring operating impulses generated by the mechanical system during subsequent intervals of operation of the mechanical system;

further analyzing the operating impulses obtained during the subsequent interval to determine the intensity and frequency of the operating impulses of the mechanical system during respective subsequent intervals;

further producing a plurality of further records of the intensity and frequency of the operating impulses obtained during respective ones of the subsequent intervals correlated to the corresponding angular positions of the mechanical system; and comparing the first, second, and further records to determine a trend in the differences in the operating impulses obtained during the respective first, second, and subsequent intervals.

3. The method of claim 2, wherein there is further provided the step of identifying a cause in the mechanical system for the trend in the differences in the operating impulses obtained during the respective first, second, and subsequent intervals.

4. The method of claim 3, wherein the mechanical system is a rotatory mechanical system and said step of identifying a cause in the mechanical system for the trend in the differences in the operating impulses obtained during the respective first, second, and subsequent intervals comprises the further step of acquiring rotatory position data of the mechanical system.

5. The method of claim 4, wherein the mechanical system is a ball screw system.

6. The method of claim 1, wherein the bearing balls in the bearing balls recirculation system have respectively discernible characteristics.

7. The method of claim 6, wherein bearing balls having respectively associated predetermined discernible characteristics are arranged in a determined sequence within a train of bearing balls.

8. The method of claim 1, wherein said step of vibration monitoring of the bearing balls recirculation system comprises the steps of:

determining a vibration signature of the bearing balls recirculation system; and determining a differential between the vibration signature of the bearing balls recirculation system and a vibration signature of a ball nut.

9. A method of determining variations in operating characteristics of a flight control actuator having a rotatory mode of operation, the method comprising the steps of:

first monitoring operating impulses generated by the flight control actuator during a first interval of operation;

first analyzing the operating impulses obtained during the first interval to determine the intensity and frequency of the operating impulses;

first correlating the operating impulses obtained during the first interval to corresponding angular positions of the rotatory mode of operation;

first producing a first record of the intensity and frequency of the operating impulses obtained during the first interval;

second monitoring operating impulses generated by the flight control actuator during a second interval of operation;

second analyzing the operating impulses obtained during the second interval to determine the intensity and frequency of the operating impulses;

second correlating the operating impulses obtained during the second interval to the corresponding angular positions of the rotatory mode of operation;

second producing a second record of the intensity and frequency of the operating impulses obtained during the second interval;

comparing the first and second records to determine differences in the operating impulses obtained during the respective first and second intervals of operation of the flight control actuator;

determining a vibration signature of a bearing balls recirculation system; and determining a mechanical reason for differences in the operating impulses obtained during the respective first and second intervals of operation of the flight control actuator.

10. The method of claim 9, wherein the flight control actuator is of the type having bearing elements, and the mechanical reason for differences in the operating impulses obtained during the respective first and second intervals of operation of the flight control actuator is deformation in the bearing elements.

11. The method of claim 9, wherein there is further provided the step of correlating the vibration signature of the bearing balls recirculation system to characteristics of the bearing balls.

12. The method of claim 11, wherein there is further provided the step of determining a direction of travel of the bearing balls in the bearing balls recirculation system.

13. The method of claim 9, wherein there is further provided the step of determining a wear condition of the bearing balls in the bearing balls recirculation system.

14. The method of claim 9, wherein the flight control actuator is of the type having bearing races, and the mechanical reason for differences in the operating impulses obtained during the respective first and second intervals of operation of the flight control actuator is deformation in the bearing races.

15. The method of claim 9, wherein the flight control actuator is of the type having a ball screw containing ball bearings, and the mechanical reason for differences in the operating impulses obtained during the respective first and second intervals of operation of the flight control actuator is reduced effectiveness of the ball bearings.

16. The method of claim 9, wherein the flight control actuator is of the type having an acme screw, and the mechanical reason for differences in the operating impulses obtained during the respective first and second intervals of operation of the flight control actuator is increased friction.

17. The method of claim 9, wherein the flight control actuator is of the type having a screw shaft, and the mechanical reason for differences in the operating impulses obtained during the respective first and second intervals of operation of the flight control actuator is damage to the screw shaft.

18. The method of claim 9, wherein the flight control actuator is of the type having a screw shaft, and the mechanical reason for differences in the operating impulses obtained during the respective first and second intervals of operation of the flight control actuator is a change in the backlash.

19. The method of claim 9, wherein there is further provided the step of installing a monitoring system in the flight control actuator for performing said steps of first and second monitoring, the monitoring system having a data port for issuing impulse data responsive to said steps of first and second monitoring and data responsive to the condition of the bearing balls in the bearing balls recirculation system.

20. The method of claim 19, wherein the data responsive to the condition of the bearing balls in the bearing balls recirculation system is representative of the presence of bearing balls in the bearing balls recirculation system.

* * * * *